(12) United States Patent
Joung et al.

(10) Patent No.: US 9,112,593 B1
(45) Date of Patent: Aug. 18, 2015

(54) APPARATUS AND METHOD FOR COMPENSATING FOR TIMING OFFSET IN SPREAD SPECTRUM SYSTEM

(71) Applicant: INNOWIRELESS CO., LTD., Gyeonggi-do (KR)

(72) Inventors: Jin Soup Joung, Gyeonggi-do (KR); Sung Chan Choi, Gyeonggi-do (KR); Yong Hoon Lim, Seoul (KR); Chang Woo Seo, Gyeonggi-do (KR)

(73) Assignee: INNOWIRELESS CO., LTD. (KR)

( * ) Notice: Subject to any disclaimer, the term of this patent is extended or adjusted under 35 U.S.C. 154(b) by 0 days.

(21) Appl. No.: 14/621,037

(22) Filed: Feb. 12, 2015

(30) Foreign Application Priority Data

Jan. 9, 2015 (KR) ........................ 10-2015-0003584

(51) Int. Cl.
*H04B 1/00* (2006.01)
*H04B 1/7075* (2011.01)

(52) U.S. Cl.
CPC .................................. *H04B 1/7075* (2013.01)

(58) Field of Classification Search
CPC ... H04L 25/03006; H04L 7/042; H04L 7/041; H04L 1/7075; H04L 1/70757; H04L 27/2662; H04L 7/033; H04L 7/043; H04L 2027/0067; H04L 27/2278; H04L 27/2657; H04B 1/7117; H04B 1/7085; H04B 1/7075; H04B 1/707
See application file for complete search history.

(56) References Cited

U.S. PATENT DOCUMENTS

| | | | | |
|---|---|---|---|---|
| 5,361,276 A | * | 11/1994 | Subramanian | 375/150 |
| 6,614,834 B1 | * | 9/2003 | Meng et al. | 375/149 |
| 6,654,432 B1 | * | 11/2003 | O'Shea et al. | 375/354 |
| 2002/0181548 A1 | * | 12/2002 | Black et al. | 375/141 |
| 2003/0142726 A1 | * | 7/2003 | Eltawil et al. | 375/146 |
| 2007/0280337 A1 | * | 12/2007 | Hays | 375/150 |

FOREIGN PATENT DOCUMENTS

| KR | 1020000037694 A | 7/2000 |
|---|---|---|
| KR | 1020100001592 A | 1/2010 |

* cited by examiner

*Primary Examiner* — Khanh C Tran
(74) *Attorney, Agent, or Firm* — Kaplan Breyer Schwarz & Ottensen, LLP

(57) ABSTRACT

An apparatus and method for compensating for a timing offset in a spread spectrum system which perform an oversampling of respective symbols to obtain a plurality of samples, estimate a chip clock timing offset and a symbol clock timing offset from the plurality of samples, and compensate for the chip clock timing offset and the symbol clock timing offset.

12 Claims, 3 Drawing Sheets

US 9,112,593 B1

APPARATUS AND METHOD FOR COMPENSATING FOR TIMING OFFSET IN SPREAD SPECTRUM SYSTEM

CROSS-REFERENCE TO RELATED APPLICATION

This application claims priority to and the benefit of Korean Patent Application No. 10-2015-0003584, filed on Jan. 9, 2015, the disclosure of which is incorporated herein by reference in its entirety.

FIELD OF THE INVENTION

The present invention relates to an apparatus and method for compensating for a timing offset in a spread spectrum system, and more particularly, to an apparatus and method for compensating for a timing offset in a spread spectrum system which perform an oversampling of respective symbols to obtain a plurality of samples, estimate a chip clock timing offset and a symbol clock timing offset from the plurality of samples, and compensate for the chip clock timing offset and the symbol clock timing offset.

BACKGROUND OF THE INVENTION

As well known, in a spread spectrum system, a transmitting-side signal is spread over chips having a smaller interval than a symbol interval, and thus the spread spectrum system is sensitive to a clock timing offset. For example, inter-chip interference caused by a chip delay is a primary cause of degradation of the system. Therefore, it is required to accurately estimate and compensate for chip and symbol clock timing offsets.

In a spread spectrum system, each data symbol is spread by a code having good correlation characteristics with other codes, that is, a code which has a peak value only when the code is multiplied by the same code at a receiving side and has a very small value when the code is multiplied by a chip-delayed code or a code of another pattern. When a sample clock offset occurs during an analog-to-digital converting (ADC) process, the same amount of offset occurs in chip clock timing also, and thus sample positions of respective data symbols having a peak value differ from each other by the offset upon despreading.

As an existing method of estimating a symbol and a chip clock timing offset, an early-late gate algorithm has been widely known. This algorithm always involves comparing a power value at a sample position ahead of an ideal sample point with a power value at a sample position behind the ideal sample point, thus requiring a large amount of computation in a system having a high data rate. Also, in a system in which a timing error fluctuates within a symbol unit, there is a high probability that an ideal sample point is not an accurate timing, and thus an error increases upon downsampling.

As another existing method of estimating a symbol and a chip clock timing offset, the Mueller-Muller algorithm is used. This algorithm requires only one sample per symbol, thus requiring a small amount of computation. However, this algorithm is sensitive to a carrier offset, and its timing estimation performance is degraded in a system with many carrier offsets.

This work was supported by the ICT R&D program of MSIP/IITP, Republic of Korea. [14-911-01-003, Development of software-based measuring equipment for enhancing inspection of radio station]

RELATED DOCUMENTS

1. Korean Patent Publication No. 10-2010-0001592 (Method and Apparatus for estimating a symbol timing offset in a wireless communication system)
2. Korean Patent Publication No. 10-2000-0037694 (METHOD FOR SIMULTANEOUSLY CORRECTING PHASE AND SYMBOL TIMING ERRORS OF ORTHOGONAL FREQUENCY DIVISION MULTIPLEX-CODE DIVISION MULTIPLE ACCESS SIGNAL)

SUMMARY OF THE INVENTION

The present invention is directed to providing an apparatus and method for compensating for a timing offset in a spread spectrum system which perform an oversampling of respective symbols to obtain a plurality of samples, estimate a chip clock timing offset and a symbol clock timing offset from the plurality of samples, and compensate for the chip clock timing offset and the symbol clock timing offset.

According to an aspect of the present invention, there is provided an apparatus for compensating for a timing offset in a spread spectrum system, the apparatus including: an oversampling unit configured to oversample, by a multiple P, data whose each of N symbols is spread over and received by C chips; an oversampled chip collection unit configured to collect C, which is a number of chips, samples at positions apart from each of all the oversampled samples by the multiple P, which is the oversampling multiple; a despreading unit configured to despread each of collected oversampled chips using a unique code of a corresponding symbol; a peak value detection/storage unit configured to detect an oversampled chip having a largest correlation value among despread oversampled chips in every predetermined section, and then store sample indices of the detected oversampled chips as peak value sample indices; a timing offset calculation unit configured to calculate a chip clock timing offset $O_{ct}$ and a system clock timing offset $O_{st}$ using the respective peak value sample indices; and a downsampling unit configured to downsample the oversampled samples while compensating for the chip clock timing offset and the system clock timing offset.

In the above-described constitution, the predetermined section may be C*P samples.

The chip clock timing offset $O_{ct}$ and the system clock timing offset $O_{st}$ may be calculated based on a number of samples between a peak value sample index of each symbol and a peak value sample index of a first symbol.

The chip clock timing offset $O_{ct}$ may be calculated using an equation below:

$$O_{ct}(n) = C_{cto} * n \quad (n \text{ is a symbol index}),$$

where the chip clock timing offset coefficient $C_{cto}$ may be calculated using an equation below:

$$C_{cto} = \frac{N^*\delta - \beta^*\alpha}{N^*\gamma - \beta^*\beta},$$

and the system clock timing offset coefficient $O_{st}$ may be calculated using an equation below:

$$O_{st} = \frac{\alpha^*\delta - \beta^*\delta}{N^*\gamma - \beta^*\beta},$$

where $d[n]=q[n]-q[0]$ $(n=0, 1, \ldots, N-1)$, $e_n=d[n]-n*P*C$ $(n=0, 1, \ldots, N-1)$, $$\alpha = \sum_{n=0}^{N-1} e_n, \beta = \sum_{n=0}^{N-1} n = \frac{N^*(N-1)}{2},$$

$$\gamma = \sum_{n=0}^{N-1} n^2 = \frac{N^*(N-1)^*(2N-1)}{6}, \delta = \sum_{n=0}^{N-1} (e_n^* n),$$

q[0] denotes the peak value sample index of the first symbol, and q[n] denotes a peak value sample index of an $n^{th}$ symbol.

A downsampling time $t_{ds}$ may be calculated using an equation below:

$t_{ds}=n*P*C+P*c+C_{cto}*n+O_{st}$ ($n$ is a symbol index, and $c$ is a chip index).

A downsampled sample value $V_{ds}$ may be calculated using an equation below:

$V_{ds}=V_I*(1-F)+(V_{I+1})*F$ (I is an integer part of $t_{ds}$, and F is a decimal part of $t_{ds}$) where $V_{ds}$ denotes a downsampled sample value compensated at the downsampling time $t_{ds}$, and $V_I$ and $V_{I+1}$ denote sample values downsampled at a time corresponding to the integer part I of the downsampling time $t_{ds}$ and a time corresponding to a sum of the integer part I and one (I+1), respectively.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

An apparatus and method for compensating for a timing offset in a spread spectrum system according to exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
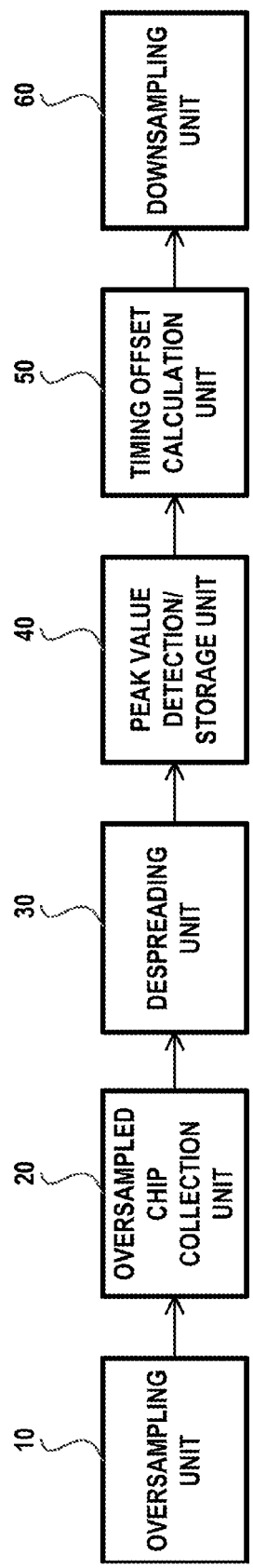
FIG. 1 is a block diagram of an apparatus for estimating and compensating for a timing offset in a spread spectrum system according to an exemplary embodiment of the present invention.

FIG. 1 is a block diagram of an apparatus for compensating for a timing offset in a spread spectrum system according to an exemplary embodiment of the present invention. As shown in FIG. 1, an apparatus for compensating for a timing offset in a spread spectrum system according to an exemplary embodiment of the present invention includes an oversampling unit 10 that oversamples data spread over and received by a plurality of, for example, C chips by, for example, a multiple P, an oversampled chip collection unit 20 that collects C, which is the number of chips, samples at positions apart from each of the oversampled samples by the multiple P, which is an oversampling multiple, a despreading unit 30 that despreads each of collected oversampled chips using a unique code of the corresponding symbol, a peak value detection/storage unit 40 that detects an oversampled chip having the largest correlation value among despread oversampled chips in every predetermined section and then stores the sample indices of the detected oversampled chips, a timing offset calculation unit 50 that calculates a chip clock timing offset and a system clock timing offset using the sample indices of the respective peak values stored in the peak value detection/storage unit 40, and a downsampling unit 60 that downsamples the oversampled samples while compensating for the chip clock timing offset and the system clock timing offset calculated by the timing offset calculation unit 50.

In a simple example for facilitating understanding, when a number N of symbols processed at a time is five, a number C of chips per symbol is three, and an oversampling multiple P is four, 12 samples are generated per symbol by the oversampling unit 10. Next, according to the above description, a total of 60 oversampled chips, that is, oversampled chips consisting of samples, (0, 4, 8), (1, 5, 9), (2, 6, 10), (3, 7, 11), (4, 8, 12), (5, 9, 13), etc. (figures in the parenthesis are sample index numbers) are collected by the oversampled chip collection unit 20. In the above example, the last symbol may lack samples to be collected as oversampled chips. To solve this problem, oversampling and despreading are performed from a position which is one symbol ahead of the first spreading symbol position to a position which is one symbol behind the last spreading symbol position.

Meanwhile, in the above example, the despreading unit 30 outputs correlation values which are a total of 60 despreading result values, and the peak value detection/storage unit 40 detects a peak value among the correlation values and then stores the sample index of the peak value. The detection of a peak value can be performed in units of the number of samples per symbol, that is, 12 samples in the above example.

Figure 2:
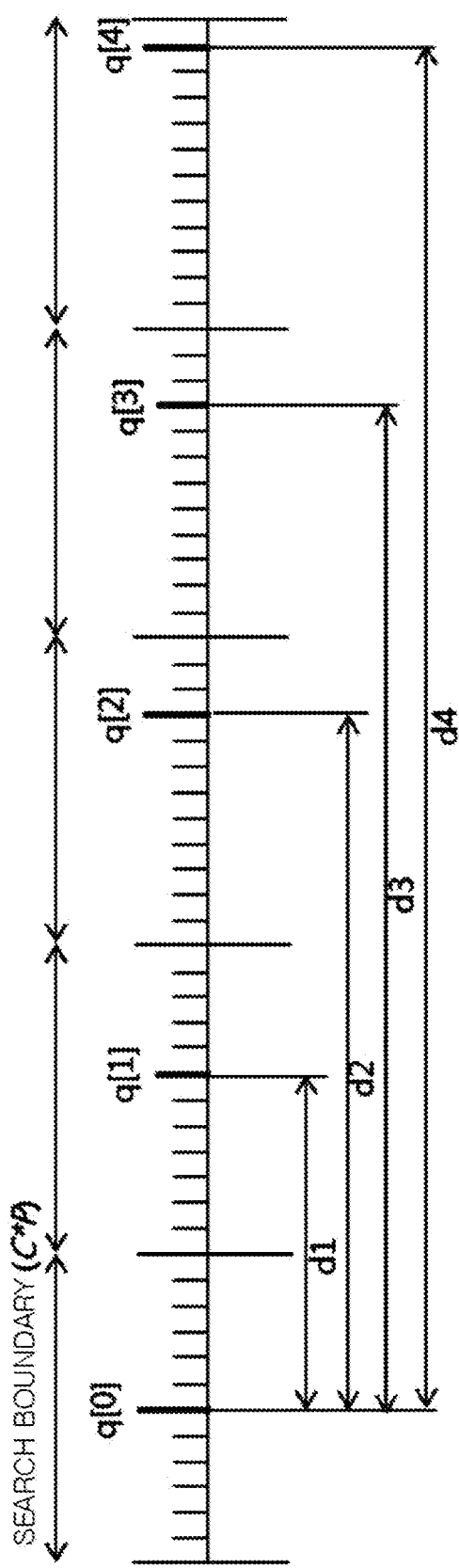
FIG. 2 is a diagram showing a sample index position having a peak value and a peak value search boundary after despreading according to an exemplary embodiment of the present invention.

FIG. 2 is a diagram showing a sample index position having a peak value and a peak value search boundary after despreading according to an exemplary embodiment of the present invention. As shown in FIG. 2, a peak value search boundary becomes C*P, that is, 12 samples in the above example because C is three and P is four. As a result, in the above example, one sample having the largest correlation value is detected among first 12 samples, and one sample having the largest correlation value is also detected among next 12 samples. Therefore, after as many samples as the symbols are detected, the sample indices of the samples (referred to as a "peak value sample index" below) are stored.

Next, the timing offset calculation unit 50 calculates a chip clock timing offset and a system clock timing offset using the peak value sample indices. Specifically, the calculation is performed based on the number of samples between the peak value sample index of each symbol and the peak value sample index of the first symbol. According to an exemplary embodiment of the present invention, a chip clock timing offset coefficient $C_{cto}$ and a system clock timing offset $O_{st}$ are calculated using Equations 1 and 2 below, respectively. All parameters used in Equations 1 and 2 and other parameters used in the process of deriving the parameters are calculated using Equations 3 to 8.

$$C_{cto} = \frac{N^*\delta - \beta^*\alpha}{N^*\gamma - \beta^*\beta} \quad \text{[Equation 1]}$$

$$O_{st} = \frac{\alpha^*\delta - \beta^*\delta}{N^*\gamma - \beta^*\beta} \quad \text{[Equation 2]}$$

$$d[n]=q[n]-q[0](n=0,1,\ldots,N-1) \quad \text{[Equation 3]}$$

$$e_n=d[n]-n^*P^*C(n=0,1,\ldots,N-1) \quad \text{[Equation 4]}$$

$$\alpha = \sum_{n=0}^{N-1} e_n \quad \text{[Equation 5]}$$

$$\beta = \sum_{n=0}^{N-1} n = \frac{N^*(N-1)}{2} \quad \text{[Equation 6]}$$

$$\gamma = \sum_{n=0}^{N-1} n^2 = \frac{N^*(N-1)^*(2N-1)}{6} \quad \text{[Equation 7]}$$

$$\delta = \sum_{n=0}^{N-1} (e_n^* n) \quad \text{[Equation 8]}$$

In Equations 1 to 8 above, N denotes the number of symbols processed at a time, P denotes an oversampling multiple, and C denotes the number of chips. Meanwhile, in a practical case and an ideal case, an error $e_n$ between the peak value sample of each symbol and the peak value sample of the first symbol is calculated using Equations 3 and 4 above. Here, q[0] denotes the peak value sample index of the first symbol, and q[n] denotes the peak value sample index of an $n^{th}$ symbol. Therefore, in the ideal case where there is no chip clock timing offset, a sample distance between the peak value sample of each symbol and the peak value sample of the first symbol is an integer multiple of C*P.

Meanwhile, when the error $e_n$ is assumed as $e_0=0$, $e_1=1$, $e_2=3$, $e_3=3$, and $e_4=5$ in the above example, α which is the sum of these errors becomes 12 according to Equation 5, and β which is an arithmetical progression from the $0^{th}$ symbol to the last symbol and γ which is an arithmetical progression from the square of the $0^{th}$ symbol to the square of the last symbol become 10 and 30 according to Equations 6 and 7, respectively. Also, δ becomes 36 according to Equation 8.

As a result, the chip clock timing offset coefficient $C_{cto}$ becomes 1.2 according to Equation 1, and the system clock timing offset $O_{st}$ becomes 1.24.

Referring back to FIG. 1, the downsampling unit 60 performs downsampling by taking data at each oversampling interval. In this process, a chip clock timing offset $O_{ct}$ is calculated per symbol index as shown in Equation 9 below, and the system clock timing offset $O_{st}$ has the same value regardless of symbol indices as shown in Equation 2. Therefore, a downsampling time for which the $n^{th}$ symbol and the $c^{th}$ chip are compensated becomes as shown in Equation 10 below.

$$O_{ct}(n)=C_{cto}^* n (n \text{ is a symbol index}) \quad \text{[Equation 9]}$$

$$t_{ds}=n^*P^*C+P^*c+C_{cto}^*n+O_{st} (n \text{ is a symbol index, and } c \text{ is a chip index}) \quad \text{[Equation 10]}$$

As in the above example, when the chip clock timing offset coefficient $C_{cto}$ is 1.2 and the system clock timing offset $O_{st}$ is 1.24, no chip clock timing offset occurs at the first symbol (in the case of n=0), a chip clock timing offset at a distance of 1.2 samples occurs at the second symbol (in the case of n=1), and a chip clock timing offset at a distance of 2.4 samples occurs at the third symbol (in the case of n=2). Likewise, a chip clock timing offset at a distance of 3.6 samples occurs at the fourth symbol (in the case of n=3), and a chip clock timing offset at a distance of 4.8 samples occurs at the last symbol (in the case of n=4). Also, each chip of each symbol needs to be compensated for a downsampling time corresponding to a distance of 1.24 samples which is the system clock timing offset.

In the above example, downsampling times for the first chip (c=0) and the second chip (c=1) of the first symbol (n=0) become 1.24 and 5.24 according to Equation 10 above, respectively. Likewise, downsampling times for the first chip (c=0) and the third chip (c=2) of the fourth symbol (n=3) become 40.84 and 48.84 according to Equation 10 above, respectively.

Meanwhile, when a downsampling time has a decimal point, it may be rounded off to the nearest integer which may be taken as the downsampling time. However, for a more accurate compensation, it is preferable to calculate the downsampling time using an interpolation scheme as shown in Equation 11 below.

$$V_{ds}=V_I^*(1-F)+(V_{I+1})^*F (I \text{ is an integer part of } t_{ds}, \text{ and } F \text{ is a decimal part of } t_{ds}) \quad \text{[Equation 11]}$$

In Equation 11 above, $V_{ds}$ denotes a downsampled value compensated at a downsampling time $t_{ds}$, and $V_I$ and $V_{I+1}$ denote sample values downsampled at a time corresponding to the integer part I of the downsampling time $t_{ds}$ and a time corresponding to the sum of the integer part I and one (I+1), respectively.

Figure 3:
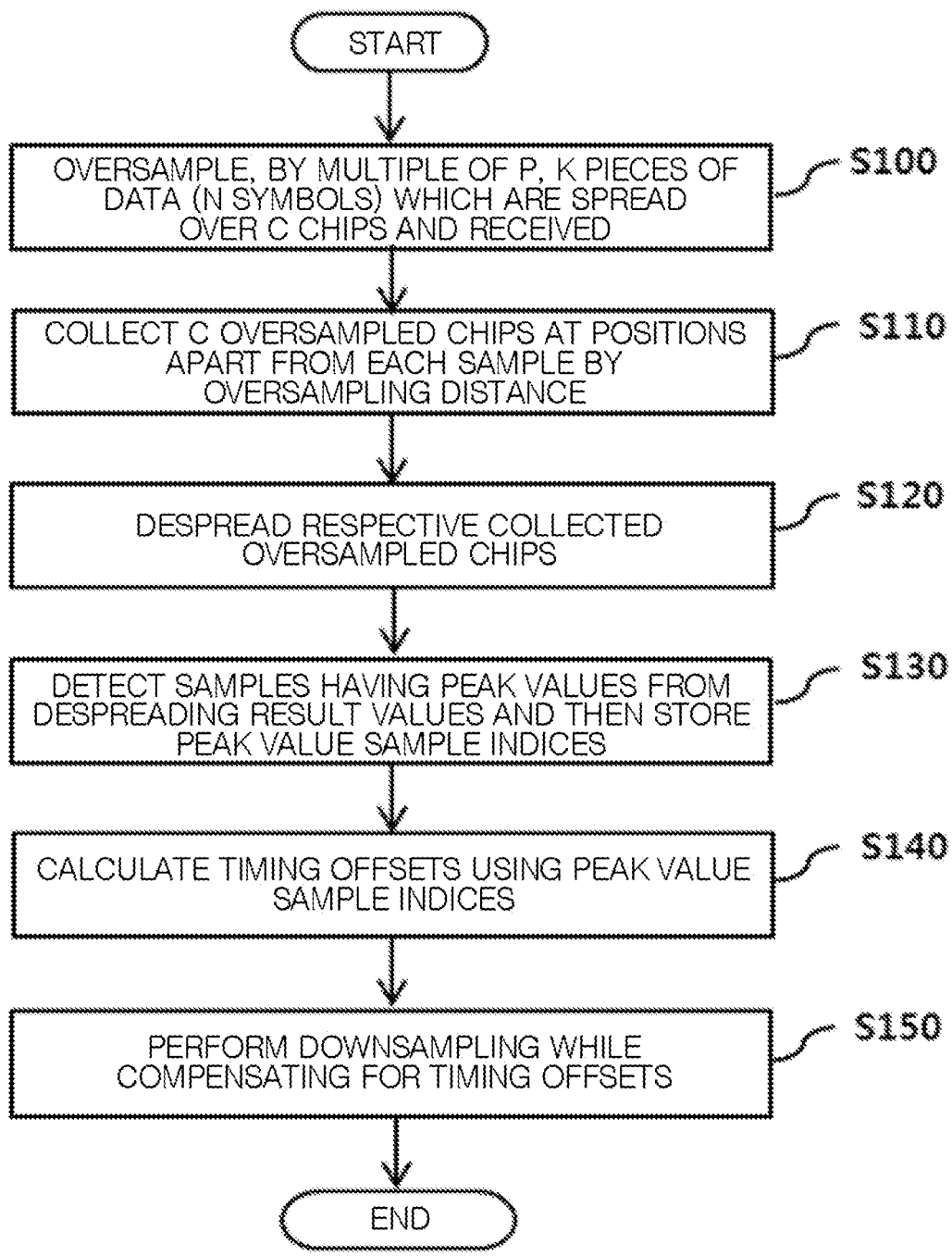
FIG. 3 is a flowchart illustrating a method of compensating for a timing offset in a spread spectrum system according to an exemplary embodiment of the present invention.

FIG. 3 is a flowchart illustrating a method of compensating for a timing offset in a spread spectrum system according to an exemplary embodiment of the present invention. As shown in FIG. 3, in an operation S100 according to a method of compensating for a timing offset in a spread spectrum system according to an exemplary embodiment of the present invention, k pieces of data (number of symbols: N) which are spread over and received by, for example, C chips are oversampled by a multiple of, for example, P. According to the above example, 12 samples are generated per symbol through operation S100.

Next, in operation S110, C, which is the number of chips, samples at positions apart from each of the oversampled samples by P, which is the oversampling multiple, are collected. According to the above example, a total of 60 oversampled chips, that is, oversampled chips consisting of samples (0, 4, 8), (1, 5, 9), (2, 6, 10), (3, 7, 11), (4, 8, 12), (5, 9, 13), etc. (figures in the parenthesis are sample index numbers) are collected through operation S110.

Next, in operation S120, each of the oversampled chips collected in operation S110 is despread using a unique code of the corresponding symbol.

Next, in operation S130, an oversampled chip having the largest correlation value is detected from despreading result values in every predetermined section, and then the sample indices of the detected oversampled chips are stored as peak value sample indices. Here, the predetermined section may be the range of the number of samples per symbol, that is, 12 samples in the above example.

Next, in operation S140, a chip clock timing offset and a system clock timing offset are calculated based on the peak value sample indices stored in the previous operation. Specifically, the calculation is performed based on the number of samples between the peak value sample index of each symbol and the peak value sample index of the first symbol.

Finally, in operation S150, downsampling is performed while compensation for the chip clock timing offset and the system clock timing offset is performed. The process of calculating the chip clock timing offset and the system clock timing offset and the downsampling process can be performed based on Equations 1 to 11 described above.

An apparatus and method for compensating for a timing offset in a spread spectrum system according to exemplary embodiments of the present invention compensate for a fixed chip clock timing offset without comparing a power value at a sample position ahead of an ideal sample point with a power value at a sample position behind the ideal sample point. Therefore, it is possible to lower complexity compared to the early-late gate algorithm.

Also, a chip clock timing offset is estimated after a plurality of samples are obtained from one symbol through oversampling, and thus it is possible to estimate and compensate for the offset more precisely compared to the Mueller-Muller algorithm. Further, since a processing gain is obtained in proportion to the number of chips in a despreading system, an additional SNR gain can be obtained.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for compensating for a timing offset in a spread spectrum system, the apparatus comprising:
   an oversampling unit configured to oversample, by a multiple P, data whose each of N symbols is spread over and received by C chips;
   an oversampled chip collection unit configured to collect C, which is a number of chips, samples at positions apart from each of all the oversampled samples by the multiple P, which is the oversampling multiple;
   a despreading unit configured to despread each of collected oversampled chips using a unique code of a corresponding symbol;
   a peak value detection/storage unit configured to detect an oversampled chip having a largest correlation value among despread oversampled chips in every predetermined section, and then store sample indices of the detected oversampled chips as peak value sample indices;
   a timing offset calculation unit configured to calculate a chip clock timing offset $O_{ct}$ and a system clock timing offset $O_{st}$ using the respective peak value sample indices; and
   a downsampling unit configured to downsample the oversampled samples while compensating for the chip clock timing offset and the system clock timing offset.

2. The apparatus of claim 1, wherein the predetermined section is C*P samples.

3. The apparatus of claim 1, wherein the chip clock timing offset $O_{ct}$ and the system clock timing offset $O_{st}$ are calculated based on a number of samples between a peak value sample index of each symbol and a peak value sample index of a first symbol.

4. The apparatus of claim 3, wherein the chip clock timing offset $O_{ct}$ is calculated using an equation below:

$$O_{ct}(n) = C_{cto} * n \text{ (n is a symbol index)},$$

where the chip clock timing offset coefficient $C_{cto}$ is calculated using an equation below:

$$C_{cto} = \frac{N^* \delta - \beta^* \alpha}{N^* \gamma - \beta^* \beta},$$

and
the system clock timing offset coefficient $O_{st}$ is calculated using an equation below:

$$O_{st} = \frac{\alpha^* \delta - \beta^* \delta}{N^* \gamma - \beta^* \beta},$$

where d[n]=q[n]−q[0] (n=0, 1, ..., N−1), $e_n$=d[n]−n*P*C (n=0, 1, ..., N−1), $$\alpha = \sum_{n=0}^{N-1} e_n, \beta = \sum_{n=0}^{N-1} n = \frac{N^*(N-1)}{2},$$

$$\gamma = \sum_{n=0}^{N-1} n^2 = \frac{N^*(N-1)^*(2N-1)}{6}, \delta = \sum_{n=0}^{N-1} (e_n^* n),$$

q[0] denotes the peak value sample index of the first symbol, and q[n] denotes a peak value sample index of an $n^{th}$ symbol.

5. The apparatus of claim 4, wherein a downsampling time $t_{ds}$ is calculated using an equation below:

$$t_{ds} = n*P*C + P*c + C_{cto}*n + O_{st} \text{ (n is a symbol index, and } c \text{ is a chip index)}.$$

6. The apparatus of claim 1, wherein a downsampled sample value $V_{ds}$ is calculated using an equation below:

$$V_{ds} = V_I*(1-F) + (V_{I+1})*F \text{ (I is an integer part of } t_{ds}, \text{ and } F \text{ is a decimal part of } t_{ds})$$

where $V_{ds}$ denotes a downsampled sample value compensated at the downsampling time $t_{ds}$, and $V_I$ and $V_{I+1}$ denote sample values downsampled at a time corresponding to the integer part I of the downsampling time $t_{ds}$ and a time corresponding to a sum of the integer part I and one (I+1), respectively.

7. A method of compensating for a timing offset in a spread spectrum system, the method comprising:
   oversampling, by a multiple P, data whose each of N symbols is spread over and received by C chips;
   collecting C, which is a number of chips, samples at positions apart from each of all the oversampled samples by the multiple P, which is the oversampling multiple;
   despreading each of collected oversampled chips using a unique code of a corresponding symbol;
   detecting an oversampled chip having a largest correlation value among despread oversampled chips in every predetermined section, and then storing sample indices of the detected oversampled chips as peak value sample indices;

calculating a chip clock timing offset $O_{ct}$ and a system clock timing offset $O_{st}$ using the respective peak value sample indices; and downsampling the oversampled samples while compensating for the chip clock timing offset and the system clock timing offset.

8. The method of claim 7, wherein the predetermined section is C*P samples.

9. The method of claim 7, wherein the chip clock timing offset $O_{ct}$ and the system clock timing offset $O_{st}$ are calculated based on a number of samples between a peak value sample index of each symbol and a peak value sample index of a first symbol.

10. The method of claim 9, wherein the chip clock timing offset $O_{ct}$ is calculated using an equation below:

$O_{ct}(n)=C_{cto}*n$ ($n$ is a symbol index), where the chip clock timing offset coefficient $C_{cto}$ is calculated using an equation below:

$$C_{cto} = \frac{N^*\delta - \beta^*\alpha}{N^*\gamma - \beta^*\beta},$$

and the system clock timing offset coefficient $O_{st}$ is calculated using an equation below:

$$O_{st} = \frac{\alpha^*\delta - \beta^*\delta}{N^*\gamma - \beta^*\beta},$$

where $d[n]=q[n]-q[0]$ (n=0, 1, . . . , N−1), $e_n=d[n]-n*P*C$ (n=0, 1, . . . , N−1), $$\alpha = \sum_{n=0}^{N-1} e_n, \beta = \sum_{n=0}^{N-1} n = \frac{N^*(N-1)}{2},$$

$$\gamma = \sum_{n=0}^{N-1} n^2 = \frac{N^*(N-1)^*(2N-1)}{6}, \delta = \sum_{n=0}^{N-1} (e_n^*n),$$

q[0] denotes the peak value sample index of the first symbol, and q[n] denotes a peak value sample index of an $n^{th}$ symbol.

11. The method of claim 10, wherein a downsampling time $t_{ds}$ is calculated using an equation below:

$t_{ds}=n*P*C+P*c+C_{cto}*n+O_{st}$ ($n$ is a symbol index, and $c$ is a chip index).

12. The method of claim 7, wherein a downsampled sample value $V_{ds}$ is calculated using an equation below:

$V_{ds}=V_I*(1-F)+(V_{I+1})*F$ ($I$ is an integer part of $t_{ds}$, and $F$ is a decimal part of $t_{ds}$)

where $V_{ds}$ denotes a downsampled sample value compensated at the downsampling time $t_{ds}$, and $V_I$ and $V_{I+1}$ denote sample values downsampled at a time corresponding to the integer part I of the downsampling time $t_{ds}$ and a time corresponding to a sum of the integer part I and one (I+1), respectively.

* * * * *